UNITED STATES PATENT OFFICE.

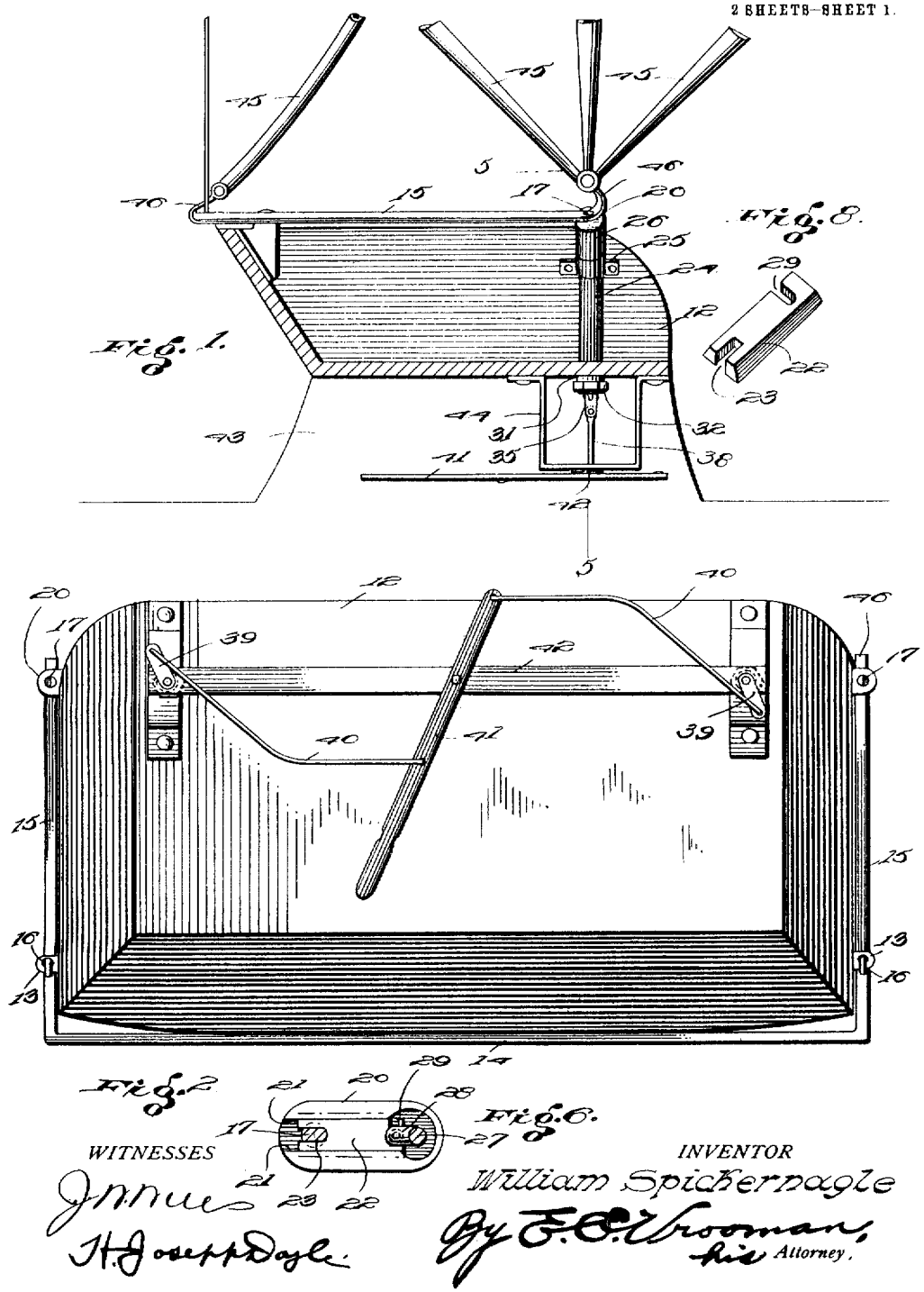

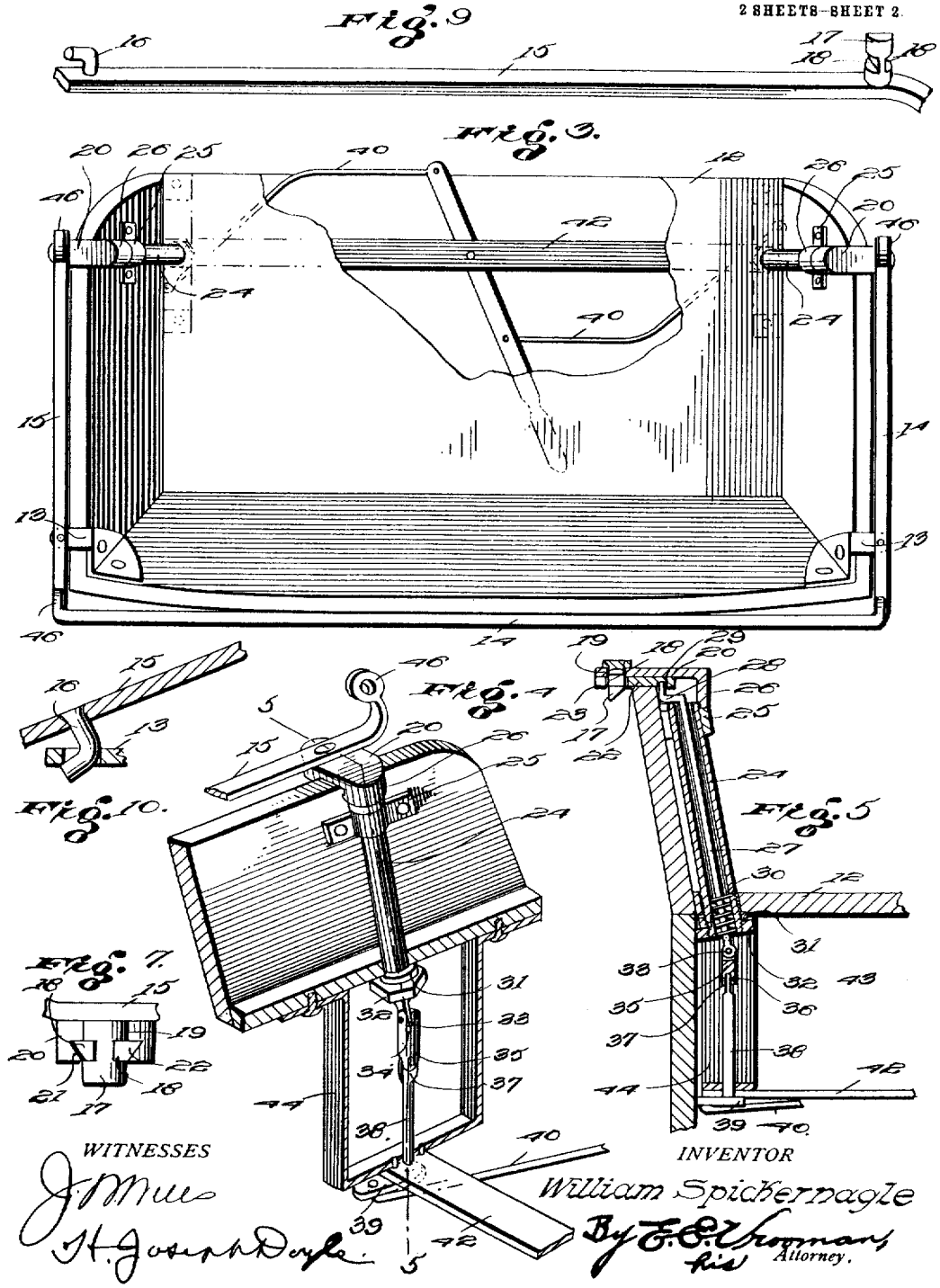

WILLIAM SPICKERNAGLE, OF OWENSBORO, KENTUCKY.

VEHICLE TOP-FASTENER.

1,010,968. Specification of Letters Patent. Patented Dec. 5, 1911.

Application filed February 6, 1911. Serial No. 606,869.

*To all whom it may concern:*

Be it known that I, WILLIAM SPICKERNAGLE, a citizen of the United States, residing at Owensboro, in the county of Daviess and State of Kentucky, have invented certain new and useful Improvements in Vehicle Top-Fasteners, of which the following is a specification, reference being had therein to the accompanying drawing.

This invention relates to the subject of vehicles, including draft vehicles, motor vehicles, children's carriages, and the like, and the principal object of the same is to provide simple and novel means for fastening a top or canopy to the vehicle that will not interfere with the raising or lowering of the canopy, and which can be readily operated to release the canopy so that the same can be bodily removed from the vehicle.

A preferred and practical embodiment of the invention is shown in the accompanying drawings, wherein:—

Figure 1 is a view in transverse vertical section of the seat of a vehicle showing the canopy therefor held in position thereon by the improved fastening means. Fig. 2 is a bottom plan view thereof. Fig. 3 is a top plan view, the canopy being omitted. Fig. 4 is a fragmentary detail perspective view showing one member of the fastener. Fig. 5 is a vertical sectional view taken on the line 5—5, of Fig. 4. Fig. 6 is a bottom plan view of one of the latches. Fig. 7 is an end view thereof. Fig. 8 is a detail perspective view of the latching bolt. Fig. 9 is a detail perspective view of one of the side members of the seat engaging frame. Fig. 10 is a detail view in longitudinal section showing the manner of attaching the frame to the seat.

Referring to the accompanying drawings by numerals, 12 designates the seat of a vehicle, the sides of which, adjacent their rear ends, are provided with flat, laterally projecting ears 13. A frame, formed of an elongated rear bar 14 and the right-angularly projecting end arms 15, surrounds the rear and sides of the seat 12 and the end arms 15 thereof have pendent angular lugs 16 adapted for interlocking hooked engagement with the ears 13 to retain said frame in surrounding relation to said seat. The forward ends of the arms 15 are provided with pendent lugs 17 having oppositely disposed transverse grooves 18 formed therein. Said lugs 17 are adapted to be passed through the transverse openings 19 in the latch casings 20 that extend across the upper edges of the sides of the seat 12 and which are provided with internal longitudinal grooves 21 that are beveled and serve as guides for the beveled edges of the latching bolts 22 which are slidable in said casings. The latching bolts 22 have their forward ends provided with longitudinal slots 23 so that they will interlock with the grooves 18 of the lugs 17 to hold said lugs in engagement with the casings 20.

The casings 20 are held in position for the reception of the lugs 17 by the tubes 24 which are fastened to the inner surfaces of the sides of the seat 12 by the straps 25 and said tubes project through the bottom of said seat. The upper ends of the tubes 24 are threaded to the tubular rear ends 26 of the casings 20. Bolt operating rods 27 extend through the tubes 24 and their upper ends are equipped with crank arms 28 that project into the casings 20 and engage the transversely arranged slots 29 in the rear ends of the bolts 22, so that by rotating the rods 27, the said bolts 22 will be bodily moved in the casings 20 to engage with or release the said bolts from the lugs 17. Springs 30 are coiled about the rods 27 within the tubes 24, said springs being fastened to the said tubes and rods and are arranged so that their tension is exerted to cause said rods to project the bolts 22 so that they will interlock with the lugs 17. The projected lower ends of the tubes 24 are externally threaded so that they can be detachably clamped to the under surface of the bottom of the seat 12 by the collars 31 and nuts 32. The lower ends of the rods 27 extend below the lower ends of the tubes 24 and terminate in eyes 33 which are pivoted in the upper end slots 34 of the links 35. Said links 35 have slots 36 in their lower ends in which the eyes 37 at the upper ends of the connecting rods 38 are pivotally fastened. Said rods 38 terminate in the cranks 39 which have link connections 40 with an operating lever 41. The operating lever 41 has been shown as pivotally mounted on a support 42 that extends the full length of the seat box 43 and is carried by the U-shaped hangers 44 that depend from the under surface of the bottom of the seat 12, but it is to be understood that this manner of supporting the lever 41 and the rods 38, which have been shown passing through the support 42, is but one of the many expedients that may be resorted to.

From the foregoing it will be clear that by swinging lever 41 in one direction, the rods 27 will be rotated against the tension of springs 30 so that the bolts 22 will release the lugs 17, whereupon the supporting frame can be readily removed from the seat.

The supporting frame carries the canopy, and the bars 45 of said canopy are pivotally connected to ears 46 that project from said frame so that the said bars can be swung on their pivotal connections to raise or lower the said canopy.

What I claim is:—

1. A canopy fastener comprising a supporting frame provided with pendent lugs, said lugs being provided with oppositely disposed transverse grooves, latch casings carried by a vehicle seat, latching bolts in said casings having end slots for interlocking engagement with the grooves of said lugs, supporting tubes for said casings, rods extending through said tubes and having crank arms for operating said bolts, springs coiled about said rods and opposing rotating of the same in one direction, connecting rods, links connecting the last-mentioned rods to the bolt operating rods, crank arms carried by the connecting rods, a hand lever, and link connections between said hand lever and the last-mentioned crank arms.

2. A canopy fastener comprising a supporting frame provided with pendent lugs, latch casings carried by the vehicle seat, latching bolts in said casings, means carried by said latching bolts for interlocking engagement with said lugs supporting tubes for said casings, rods extending through said tubes and having crank arms for operating said bolts, means for opposing rotation of said rods in one direction, and means for operating said rods.

3. A canopy fastener comprising a supporting frame provided with pendent lugs, latch casings carried by a vehicle seat, U-shaped hangers carried by said seat, latch means carried by said latch casings, crank arms positioned in said U-shaped hangers, and means for operating said crank arms for shifting said latch means within said latch casing.

In testimony whereof I hereunto affix my signature in presence of two witnesses.

WILLIAM SPICKERNAGLE.

Witnesses:
 FLORENCE H. CURETON,
 LA VEGA CLEMENTS.